US 8,416,912 B2

(12) United States Patent
Gentet et al.

(10) Patent No.: US 8,416,912 B2
(45) Date of Patent: Apr. 9, 2013

(54) NUCLEAR FUEL ASSEMBLY INCLUDING AN INTERNAL REINFORCING DEVICE

(75) Inventors: Guy Gentet, Lyons (FR); Angelo Beati, Lyons (FR); Jacques Gauthier, Cailloux-sur-Fontaines (FR)

(73) Assignee: Areva NP, Courbevoie (FR)

( * ) Notice: Subject to any disclaimer, the term of this patent is extended or adjusted under 35 U.S.C. 154(b) by 0 days.

(21) Appl. No.: 10/573,642

(22) PCT Filed: Sep. 23, 2004

(86) PCT No.: PCT/FR2004/002401
§ 371 (c)(1),
(2), (4) Date: Aug. 20, 2008

(87) PCT Pub. No.: WO2005/034137
PCT Pub. Date: Apr. 14, 2005

(65) Prior Publication Data
US 2008/0304612 A1    Dec. 11, 2008

(30) Foreign Application Priority Data
Sep. 30, 2003   (FR) ..................................... 03 11461

(51) Int. Cl.
*G21C 3/32*   (2006.01)
(52) U.S. Cl. ........ 376/448; 376/409; 376/426; 376/434; 376/438; 376/462
(58) Field of Classification Search .................. 376/438, 376/462
See application file for complete search history.

(56) References Cited

U.S. PATENT DOCUMENTS

| 4,666,664 | A | | 5/1987 | Doshi | |
|---|---|---|---|---|---|
| 5,263,072 | A | * | 11/1993 | Canat et al. | 376/439 |
| 5,625,657 | A | * | 4/1997 | Gallacher | 376/261 |

FOREIGN PATENT DOCUMENTS

| EP | 0 261 544 | 3/1988 |
|---|---|---|
| EP | 0 516 542 | 12/1992 |
| FR | 2 665 291 | 1/1992 |
| WO | WO 2005/034137 | 4/2005 |

OTHER PUBLICATIONS

"Fuel cartridge, for PWR reactor, has reinforcing part extending between support plates", Derwent, Nov. 9, 2001 XP002284687.
Patent Abstracts of Japan, vol. 0174, No. 61 (P-1598) (Aug. 23, 1993), & JP 05 107377 (Apr. 27, 1993).

* cited by examiner

*Primary Examiner* — Jack W Keith
*Assistant Examiner* — Marshall O'Connor
(74) *Attorney, Agent, or Firm* — Davidson, Davidson & Kappel, LLC

(57) ABSTRACT

The nuclear fuel assembly means a group of nuclear fuel rods disposed in a substantially regular array together with a support skeleton (5), the assembly having: two nozzles; guide tubes interconnecting the nozzles; and spacer grids secured to the guide tubes for holding the rods. The assembly includes at least one support skeleton reinforcing device disposed between two successive spacer grids and secured to guide tubes. The reinforcing device is disposed inside the group of rods and presents a transverse extent that is smaller than the transverse extent of the array of nuclear fuel rods.

14 Claims, 11 Drawing Sheets

NUCLEAR FUEL ASSEMBLY INCLUDING AN INTERNAL REINFORCING DEVICE

FIELD OF THE INVENTION

The present invention relates to nuclear fuel assemblies. By way of example, it applies to fuel assemblies for pressurized water nuclear reactors.

BACKGROUND INFORMATION

Generally, nuclear fuel assemblies comprise nuclear fuel rods and a support skeleton having two nozzles, guide tubes interconnecting the nozzles, and spacer grids for holding the rods.

Each spacer grid comprises two sets of crossed plates and an outer belt, thus defining cells, some of which have guide tubes passing through them and others have fuel rods passing through them. The plates are provided with means for holding the rods at the nodes of a substantially regular array and they are secured to at least some of the guide tubes.

At least one of the spacer grids also serves to support the rods. For this purpose, it is usually provided with springs that are cut out in the plates or that are fitted to the plates, and that serve to press the rods against dimples stamped in the plates and forming the opposite faces of the cells.

The other grids serve only to hold the rods at the nodes of the array. To do this, they present dimples on each of the faces of a cell having a rod passing therethrough, the dimples serving to press against the rod.

French patent No. 2 665 291 also discloses additional mixer grids for interposing between the spacer grids and having fins for improving the mixing of the cooling fluid flowing through the assemblies.

Once manufactured, such assemblies extend rectilinearly and vertically along a direction that is referred to as being "axial". Once in place in a reactor, these assemblies deform because of the irradiation and can take on C-shapes, S-shapes, or W-shapes.

Such deformations lead to numerous problems. In operation, they make it more difficult to insert control and shutdown clusters into the guide tubes.

During handling, these deformations increase the risk of assemblies catching on one another, e.g. during operations of loading or unloading the core of the reactor.

SUMMARY

An objective of the invention is to solve this problem by limiting the deformation of nuclear fuel assemblies under irradiation.

To this end, the invention provides a nuclear fuel assembly of the type comprising a group of nuclear fuel rods and a support skeleton, the assembly comprising:
  two nozzles;
  guide tubes interconnecting the nozzles; and
  spacer grids secured to the guide tubes and serving to hold the rods; the nuclear fuel rods extending along a longitudinal direction and being disposed in a substantially regular array; the assembly being characterized in that it includes at least one support skeleton reinforcing device disposed between two successive spacer grids and secured to the guide tubes, and in that the reinforcing device is disposed inside the group of rods and presents a transverse extent that is less than the transverse extent of the array of rods.

In particular embodiments, the assembly may further comprise one or more of the following characteristics taken singly or in any technically feasible combination:
  the reinforcing device does not extend into the peripheral layer of rods;
  the reinforcing device does not extend between the peripheral layer of rods and the adjacent layer of rods;
  the reinforcing device extends longitudinally substantially as far as the spacer grid immediately above it;
  the reinforcing device defines at least one transverse flow passage above the spacer grid immediately beneath it, said passage serving to pass a cooling fluid for flowing through the assembly;
  the reinforcing device extends longitudinally substantially as far as the spacer grid immediately below it, and the passage is formed by an opening formed through the bottom end of the reinforcing device;
  the bottom end of the reinforcing device is disposed at a distance from the spacer grid immediately beneath it so as to define the transverse flow passage for the cooling fluid;
  the reinforcing device is secured to at least two guide tubes;
  the reinforcing device is a substantially plane plate;
  the reinforcing device is substantially parallel to one of the faces of the group of nuclear fuel rods;
  the reinforcing device is an angle member forming at least one L-shape;
  the angle member is disposed in a corner of the group of nuclear fuel rods;
  the reinforcing device does not have a mixer arrangement for mixing the cooling fluid that is to flow through the assembly; and
  the reinforcing device does not have means for holding the nuclear fuel rods.

BRIEF DESCRIPTION OF THE DRAWINGS

The invention can be better understood on reading the following description given purely by way of example and made with reference to the accompanying drawings, in which.

DETAILED DESCRIPTION

Figure 1:
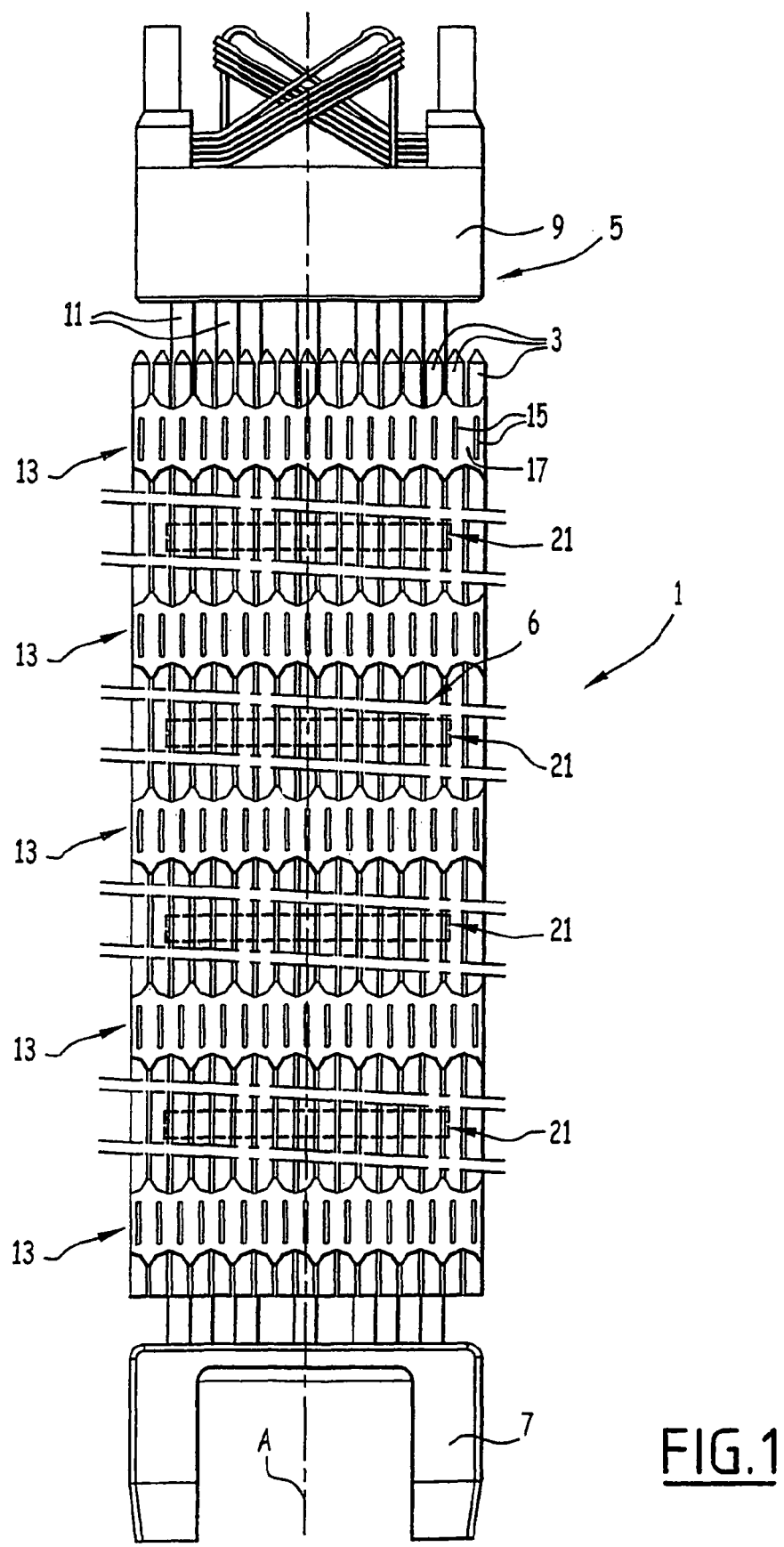
FIG. 1 is a diagrammatic elevation view of a nuclear fuel assembly in a first embodiment of the invention.

FIG. 1 is a diagram of a nuclear fuel assembly 1 for a pressurized water reactor. The assembly 1 extends vertically and in rectilinear manner along a longitudinal direction A.

The assembly 1 mainly comprises nuclear fuel rods 3 and a structure or skeleton 5 for supporting the rods 3.

Figure 3:
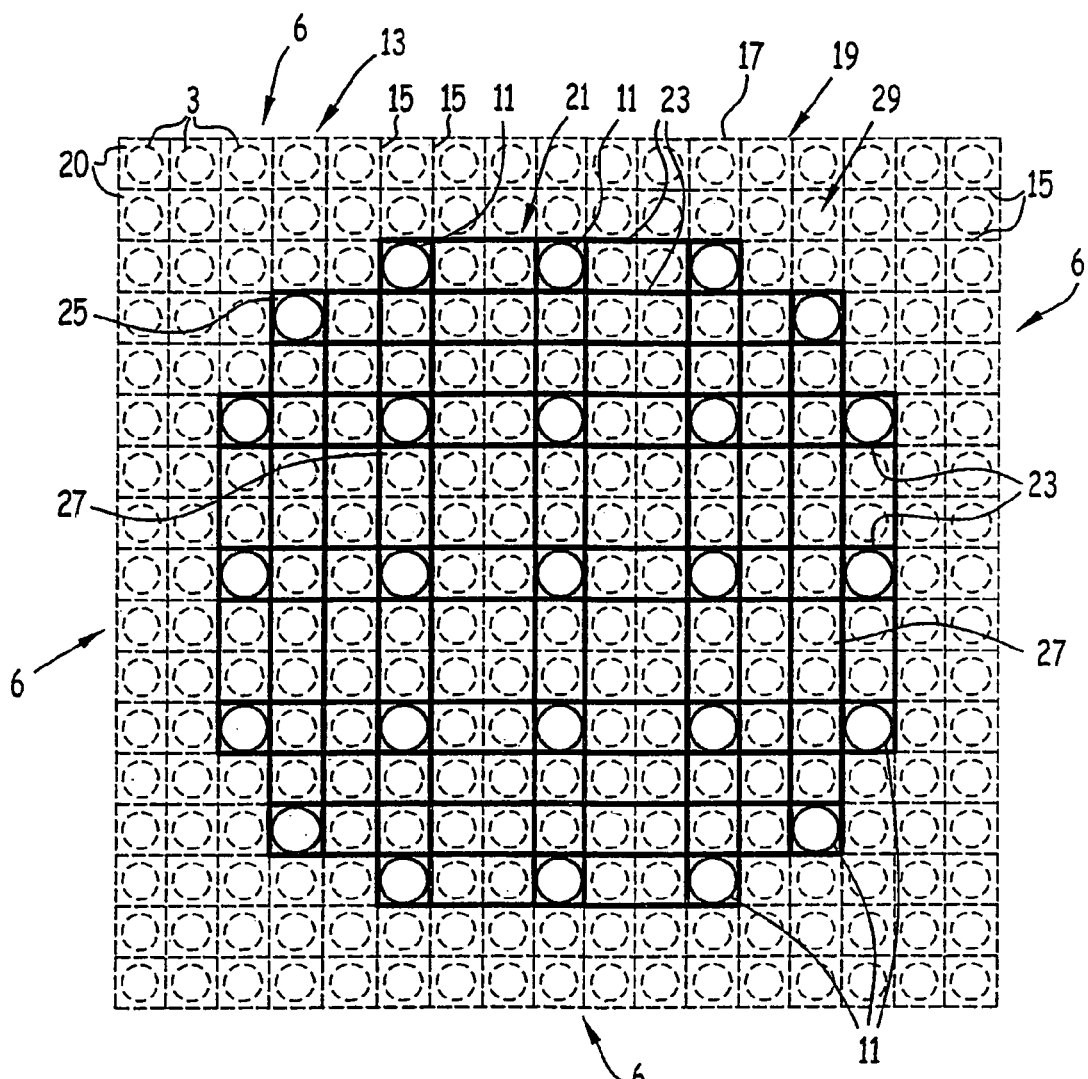
FIG. 3 is a diagrammatic plan view comparing the structure and the extent of the intermediate reinforcing device of FIG. 2 relative to the array of nuclear fuel rods and to a spacer grid of the FIG. 1 assembly.

In conventional manner, the rods 3 extend vertically and are disposed in a substantially regular, square-based array, as can be seen in FIG. 3 where the rods 3 are shown in dashed lines.

In the example shown, the assembly 1 comprises a group of 264 rods 3 and, seen from above, the array forms a square having a side of 17 rods. The group of rods 3 thus possesses four side faces 6 each having 17 rods.

The supporting skeleton 5 essentially comprises:
a bottom nozzle 7 and a top nozzle 9;
guide tubes 11 for receiving the rods of a control or shutdown cluster (not shown); and
spacer grids 13 for holding the rods 3 at the nodes of the array.

The nozzles 7 and 9 are secured to the longitudinal ends of the guide tubes 11.

As seen in FIG. 3, in which a spacer grid 13 is drawn in dashed lines, each spacer grid 13 comprises, for example, two sets of crossed plates 15 and a peripheral belt 17 surrounding the peripheral layer 19 of rods 3.

The grid 13 defines cells 20, most of which receive a respective rod 3. Bosses are provided in the plates 15 to press against the rods 3 and hold them at the nodes of the array. Each of the other cells 20 receives a guide tube 11.

Also in conventional manner, the spacer grids 13 are secured to the guide tubes 11 and are distributed along the height of the rods 3.

The rods 3 may be held axially by a single spacer grid 13, e.g. the top grid 13, which is then provided for this purpose with springs for thrusting the rods 3 against dimples cut out in the plates 15 or fitted thereto.

In the invention, between the spacer grid 13, the assembly 1 includes intermediate devices 21 for reinforcing the skeleton 5.

For reasons explained below, these reinforcing devices 21 are not visible from outside the assembly 1, and they are therefore shown in dashed lines in FIG. 1.

In the example shown, an intermediate reinforcing device 21 is provided between each pair of spacer grids 13.

Figure 2:
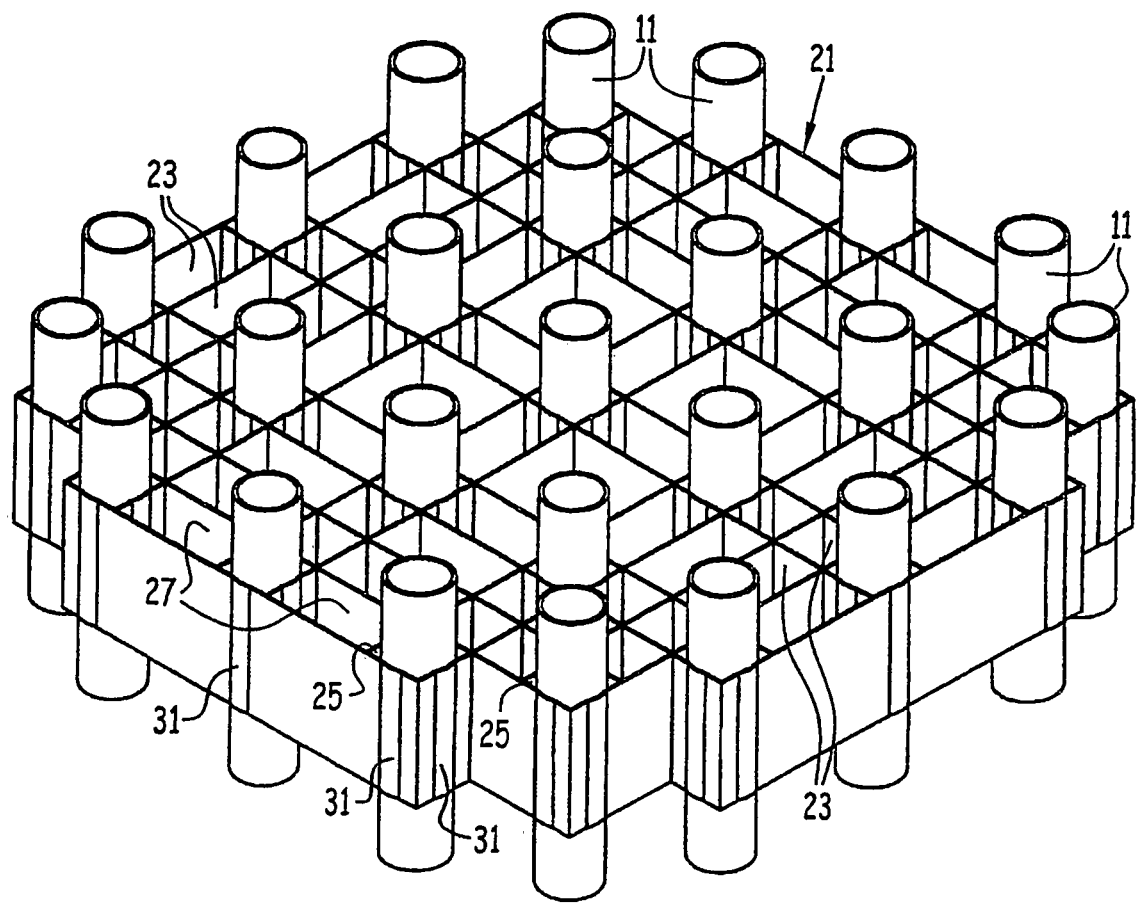
FIG. 2 is a fragmentary diagrammatic view in perspective showing an intermediate reinforcing device of the FIG. 1 assembly.

Since the structure of the intermediate reinforcing devices 21 is similar, only one device 21 is described with reference to FIGS. 2 and 3. It should be observed that only segments of the guide tubes 11 are shown in FIG. 2. In FIG. 3, the guide tubes 11 and the intermediate reinforcing device 21 are drawn in continuous lines.

The device 21 comprises two sets of crossed plates 23 that are secured to one another, e.g. by welding at their points of intersection. By way of example, the plates 23 are about 0.425 millimeters (mm) thick and of a height lying in the range about 18 mm to about 28 mm. They may be made of zirconium alloy.

Between them, the plates 23 define cells 25, each for receiving a respective guide tube 11, and cells 27 for receiving the rods 3. As seen in FIG. 3, some of the cells 27 are individual cells that receive only one rod 3, whereas others receive two or four rods 3.

The plates 23 of the intermediate reinforcing device 21 form a lattice structure extending solely between the guide tubes 11. This lattice structure thus forms an openwork structure.

Thus, the transverse extent of the plates 23, and thus of the reinforcing device 21, is limited. In particular, the plates 23 do not extend between the rods 3 of the outer peripheral layer 19 of rods 3, nor between said layer 19 and the intermediately adjacent layer 29 which, in the example shown, comprises 15 rods per side. The intermediate reinforcing device 21 stops in the vicinity of this layer 29.

The plates 23 do not have any arrangement for holding the rods 3, and as a result the cells 27 are of dimensions that are greater than the dimensions of the rods 3, thereby surrounding them with clearance.

Furthermore, the intermediate reinforcing device 21 has no arrangement for mixing cooling fluid flowing through the fuel assembly 1, e.g. no fins.

The intermediate reinforcing device 21 is secured to the guide tubes 11, e.g. by welding in slightly bulging zones 31 (FIG. 2) of the plates 23. Such welding may be applied to the tops and/or the bottoms of the plates 23.

Figure 4:
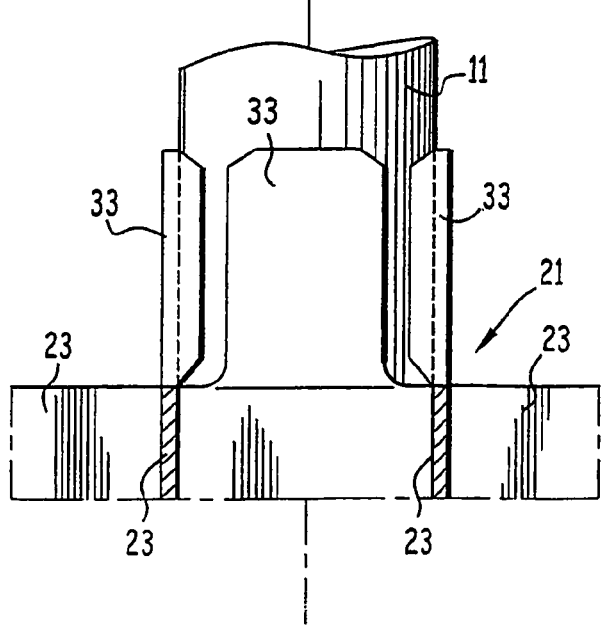
FIG. 4 is a fragmentary diagrammatic view in section showing the connection to the guide tubes in a variant of the intermediate reinforcing device of FIG. 2.

In a variant shown in FIG. 4, the plates 23 may be welded to the guide tubes 11 via welding tabs 33 which project from the plates 23, e.g. upwards.

If the assembly 1 includes an instrumentation tube instead of the central guide tube 11, then the intermediate reinforcing devices 21 can be welded thereto.

Because of the presence of the intermediate reinforcing devices 21, both the skeleton of the support 5 and thus the entire assembly 1 are more rigid.

Figure 5:
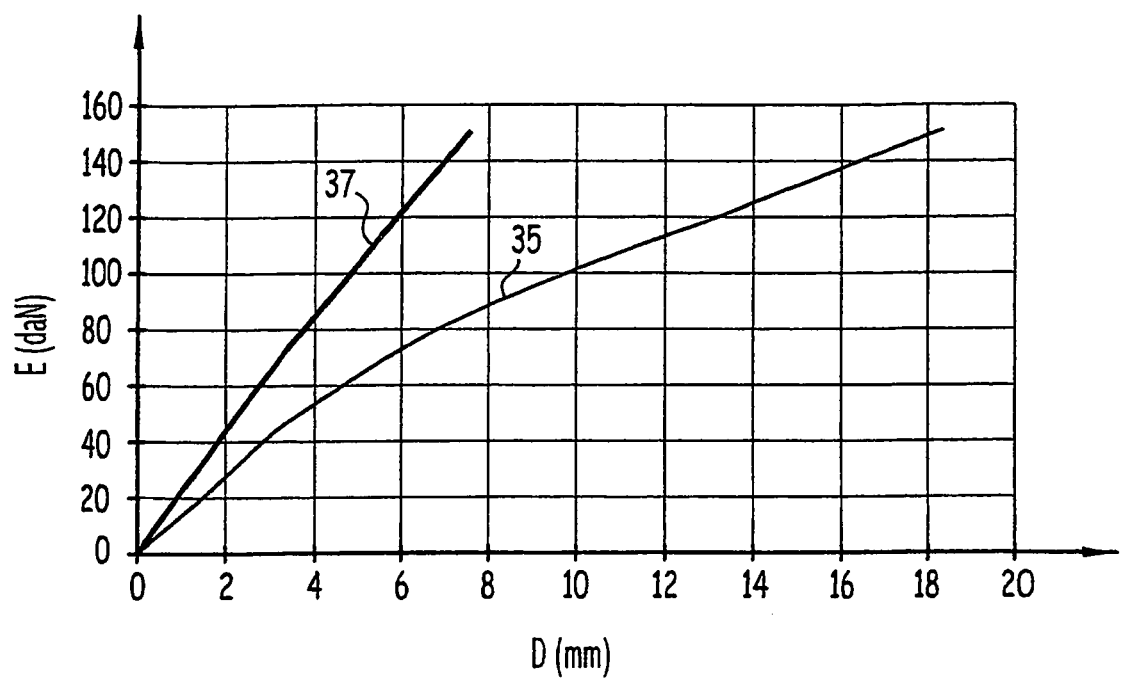
FIG. 5 is a graph comparing the rigidity of a conventional assembly with that of the FIG. 1 assembly, prior to irradiation.

This is confirmed by FIG. 5 which shows the result of simulations of lateral deformations to nuclear fuel assemblies before irradiation. In this figure lateral displacement D in mm is plotted along the abscissa and the force E in daN necessary for obtaining this deformation is plotted up the ordinate.

Curve 35 corresponds to a prior art assembly immediately after manufacture, i.e. prior to irradiation. Curve 37 corresponds to the assembly 1 of FIG. 1 immediately after manufacture. Thus, the presence of the intermediate reinforcing devices 21 enables the stiffness or lateral rigidity of the assembly 1 to be increased by about 60% at the beginning of its lifetime compared with a conventional assembly.

Figure 6:
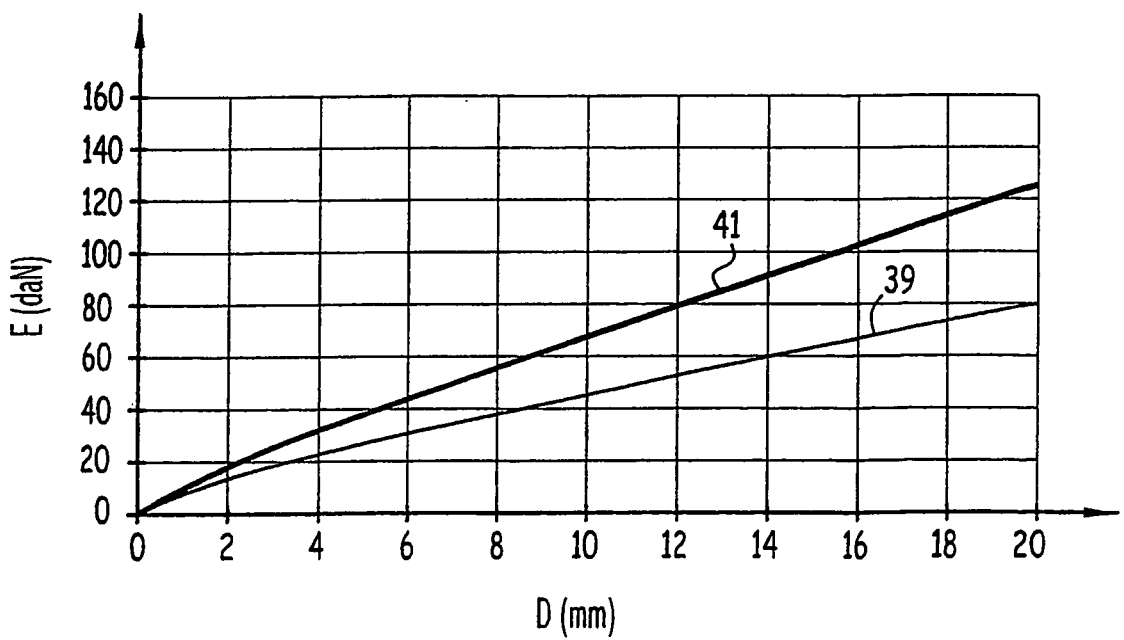
FIG. 6 is a view analogous to FIG. 5, after irradiation.

FIG. 6 corresponds to analogous simulations performed after irradiation. Curve 39 corresponds to a conventional assembly and curve 41 to the assembly 1 of FIG. 1. The increase in the lateral rigidity of the assembly 1 thus remains after irradiation, with this increase continuing to be about 60%.

Thus, the assembly 1 presents stiffness at the end of its lifetime equivalent to that of a conventional assembly at the beginning of its lifetime. The use of intermediate reinforcing devices 21 for reinforcing the support skeleton 5 makes it possible to compensate for the effect of irradiation.

It has been found that the reduction in rigidity of conventional assemblies after irradiation is due to the guide tubes creeping and to changes to the conditions whereby rods 3 are held by the skeleton 5, such that the rods 3 contribute about 65% of the rigidity of an assembly prior to irradiation but contribute no more than about 40% of the stiffness after irradiation.

The stiffening of the skeleton 5 by the intermediate reinforcing devices 21 thus makes it possible to increase the lateral stiffness thereof, including after irradiation. As a result the openwork structure of the reinforcing devices 21, which are also of small transverse extent, ensures that head losses in the cooling fluid remain limited.

Figure 7:
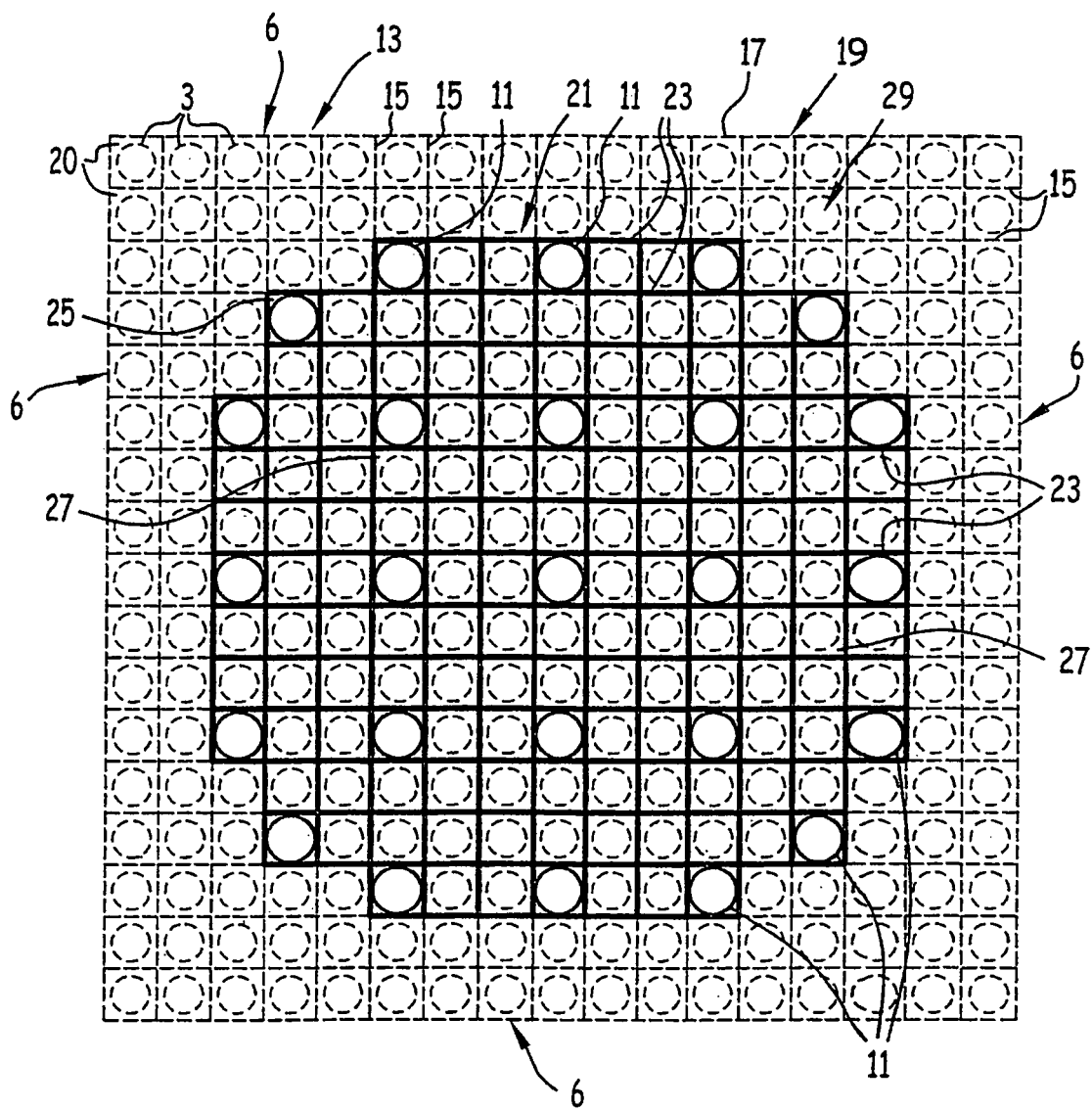
FIG. 7 is a view analogous to FIG. 3, showing a variant of the intermediate reinforcing device of FIG. 2.

In the variant shown in FIG. 7, the reinforcing device 21 may be constituted by a lattice structure that is more dense such that all of the cells 27 are individual cells each receiving no more than a single rod 3.

This variant makes it possible to further increase the lateral rigidity of the assembly 1 but also increases head loss in the cooling fluid passing through the assembly 1.

More generally, the intermediate reinforcing devices 21 can be secured to the guide tubes by means other than welding, e.g. by tube expansion, by sleeving, etc. . . . .

Similarly, the assembly 1 need not include an intermediate reinforcing device 21 between each pair of spacer grids 13.

In certain variants, the intermediate reinforcing devices 21 may also have an arrangement for holding the rods 3 and/or an arrangement for mixing the cooling fluid flowing through the assembly.

Naturally, intermediate reinforcing devices 21 could be sold on their own.

Figure 8:
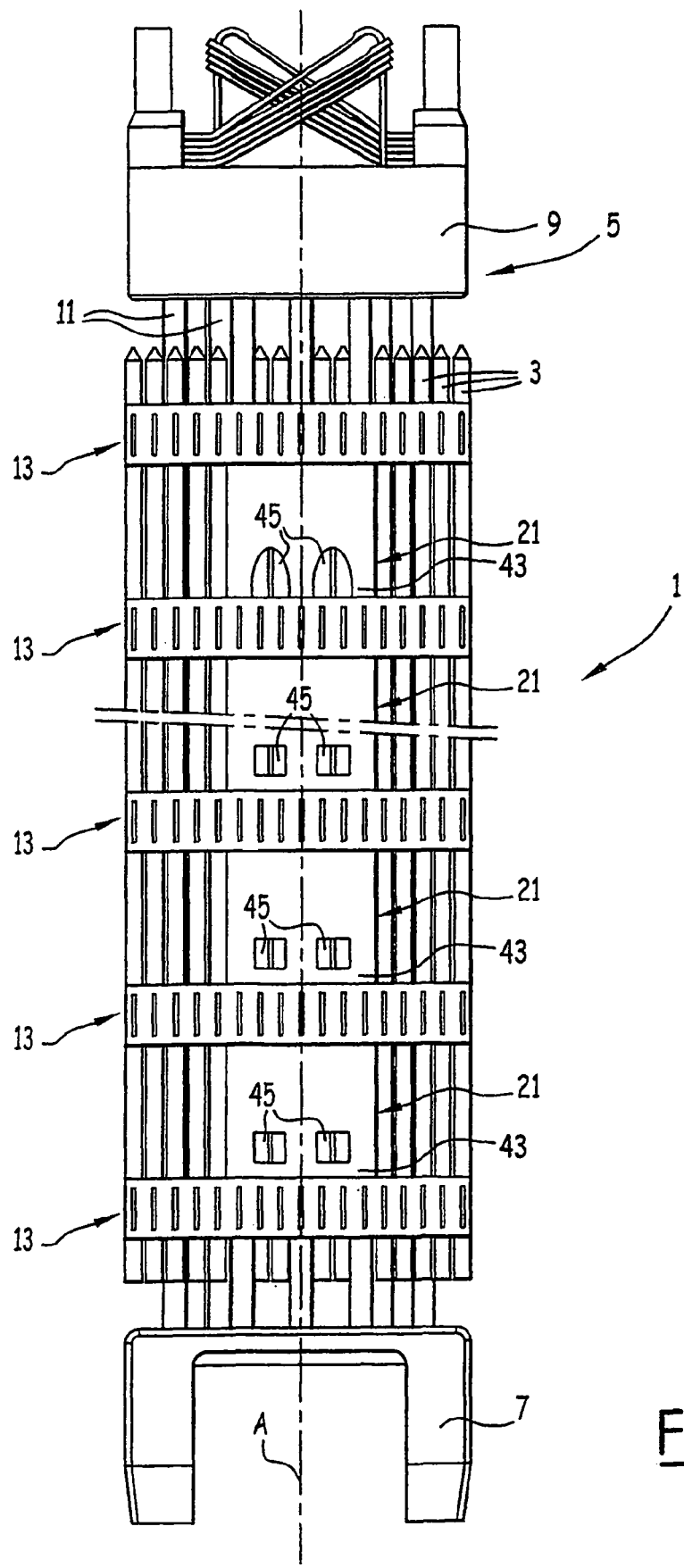
FIG. 8 is a diagrammatic elevation view of a nuclear fuel assembly in a second embodiment of the invention, two rows of rods being omitted so as to make the intermediate reinforcing devices visible.
Figure 9:
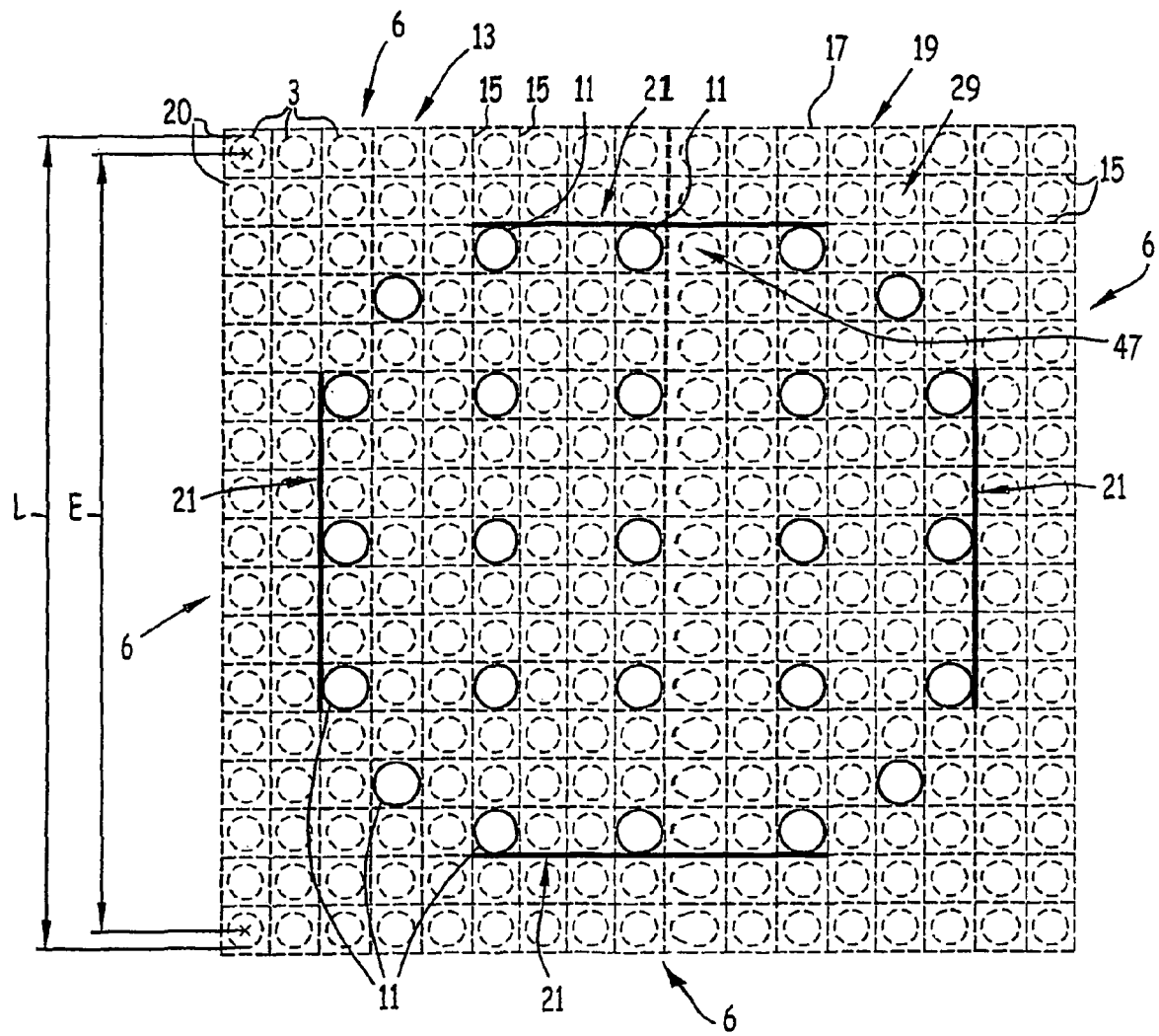
FIG. 9 is a view analogous to FIG. 3 showing an intermediate reinforcing device of the FIG. 8 assembly.

FIGS. 8 and 9 show a second embodiment of the invention which differs from the above-described embodiment as follows.

The intermediate reinforcing devices 21 are formed by substantially plane plates. The assembly 1 comprises four plates 21 between each pair of spacer grids 13.

Each plate 21 extends substantially over the entire height between the two successive spacer grids 13 between which it is located. The height of the plates 21 may thus be about 480 mm.

The bottom end 43 of each plate 21 is provided with openings 45 for passing cooling fluid. These openings 45 may have a variety of shapes.

Thus, and as shown by the top plate 21 in FIG. 8, these openings 45 may have shapes that are partially elliptical. These openings 45 may also have shapes that are rectangular or square, as shown by the lower plates 21 in FIG. 8.

As can be seen in FIG. 9, the plates 21 are disposed within the group of rods 3. More precisely, the plates 21 extend between the layer 29 of rods 3 and the inwardly adjacent layer 47 of rods 3, e.g. the layer that has ten rods 3 and three guide tubes 11 per side in the example shown. To make the plates 21 visible in FIG. 8, the two rows of rods 3 situated at the front of this view have been omitted.

Each plate 21 extends substantially parallel to a example face 6 of the group of rods 3 and is disposed substantially in the center of said face 6. The plate 21 is secured, e.g. by welding, to the three guide tubes 11 which are placed facing the face 6 in question.

In the example shown, the plates 21 extend transversely over a length corresponding to seven steps in the array of rods 3.

The openings 45 enable the cooling fluid to flow transversely above the spacer grids 13.

Thus, the reinforcing plates 21 do not prevent the cooling liquid mixing effectively, e.g. mixing as produced by mixer fins placed on the downstream side, i.e. above the spacer grids 13.

In the variant shown in FIG. 10, the bottom end 43 of each plate 21 can be spaced apart, e.g. by 15 centimeters (cm) from the spacer grid 13 immediately below it, i.e. situated immediately below the plate 21 under consideration.

A passage 49 enabling the cooling fluid to flow transversely is thus defined between each plate 21 and the spacer grid 13 immediately beneath it.

This second embodiment, like the first, enables the stiffness of the assembly 1 to be increased, both at the beginning of its lifetime and at the end of its lifetime.

Figure 10:
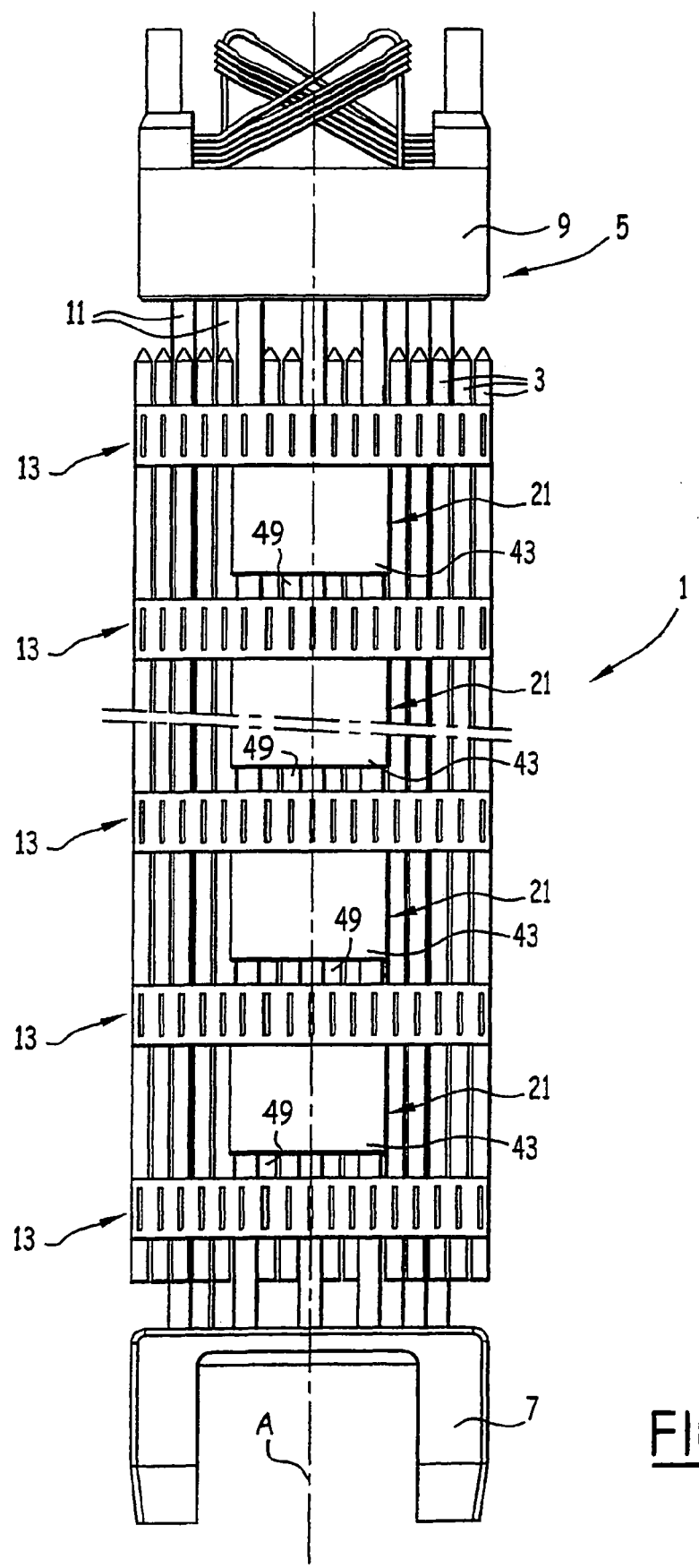
FIG. 10 is a view analogous to FIG. 8 showing another variant of the second embodiment of the invention.
Figure 11:
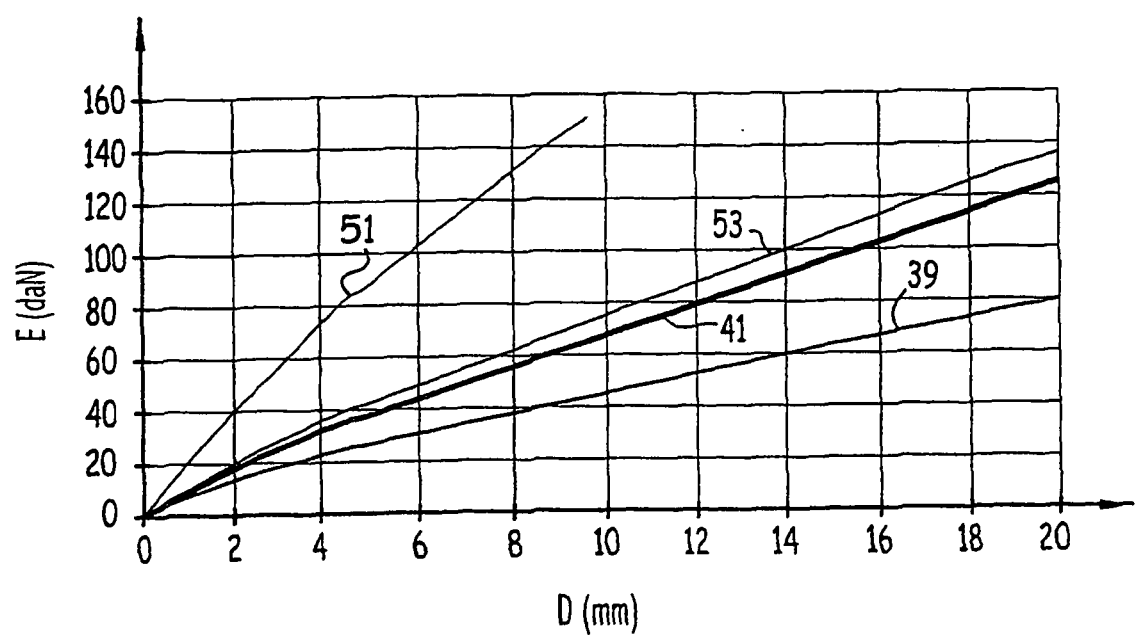
FIG. 11 is a graph comparing the rigidity of a conventional assembly with that of the assemblies of FIGS. 8 and 10 after irradiation.

This is confirmed by FIG. 11 which reproduces the graph of FIG. 6 having added thereon a curve 51 corresponding to the assembly of FIGS. 8 and 9 and a curve 53 corresponding to the variant of FIG. 10.

In addition, this second embodiment leads to head losses in the cooling fluid that are low.

Each reinforcing plate 21 extends transversely in one direction only, and in addition its transverse extent in this direction is small. In particular, the transverse extent of the plates 21 is less than the transverse extent E of the array of rods 3. This extent E is shown in FIG. 9 and corresponds to the distance between two opposite nodes, i.e. between the longitudinal axes of two opposite rods 3.

It should even be observed in this embodiment that the transverse extent of the plates 21 is less than half the extent E.

Figure 12:
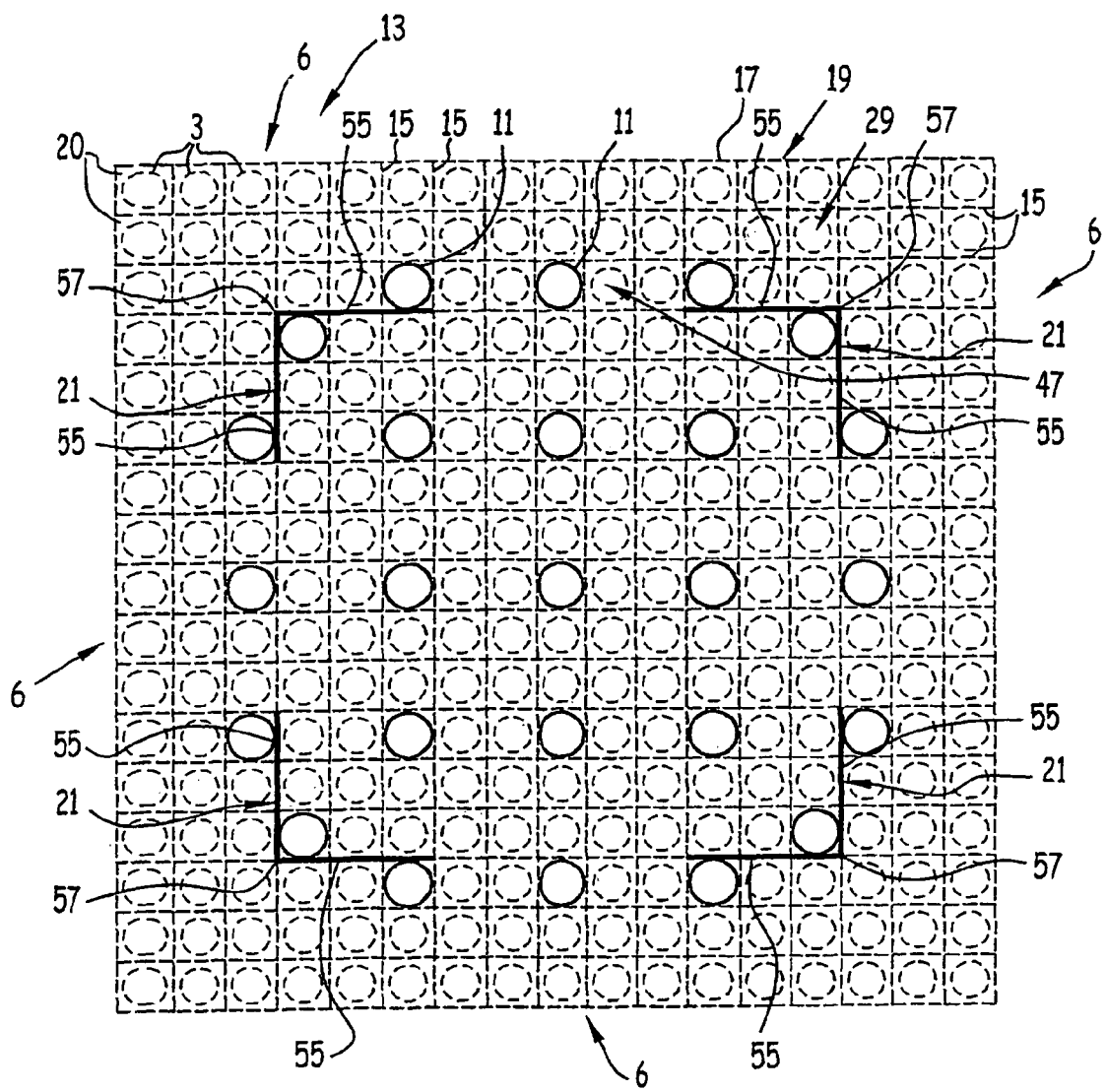
FIG. 12 is a view analogous to FIG. 3 showing a third embodiment of the invention.

FIG. 12 shows a third embodiment that differs from the second embodiment as follows.

Each reinforcing device 21 is formed by an L-shaped angle member comprising two limbs 55 that meet to form substantially a right angle 57.

These angle members 21 are four in number between each successive pair of spacer grids 13, being disposed at the corners of the group of rods 3. Their own corners 57 are open towards the inside of the assembly.

Each angle member 21 secured to three guide tubes 11. One of these guide tubes 11 is located in the corner 57 and the other two guide tubes 11 are situated on the outside of the angle member 21 at the ends of the limbs 55 remote from the corner 57.

Figure 13:
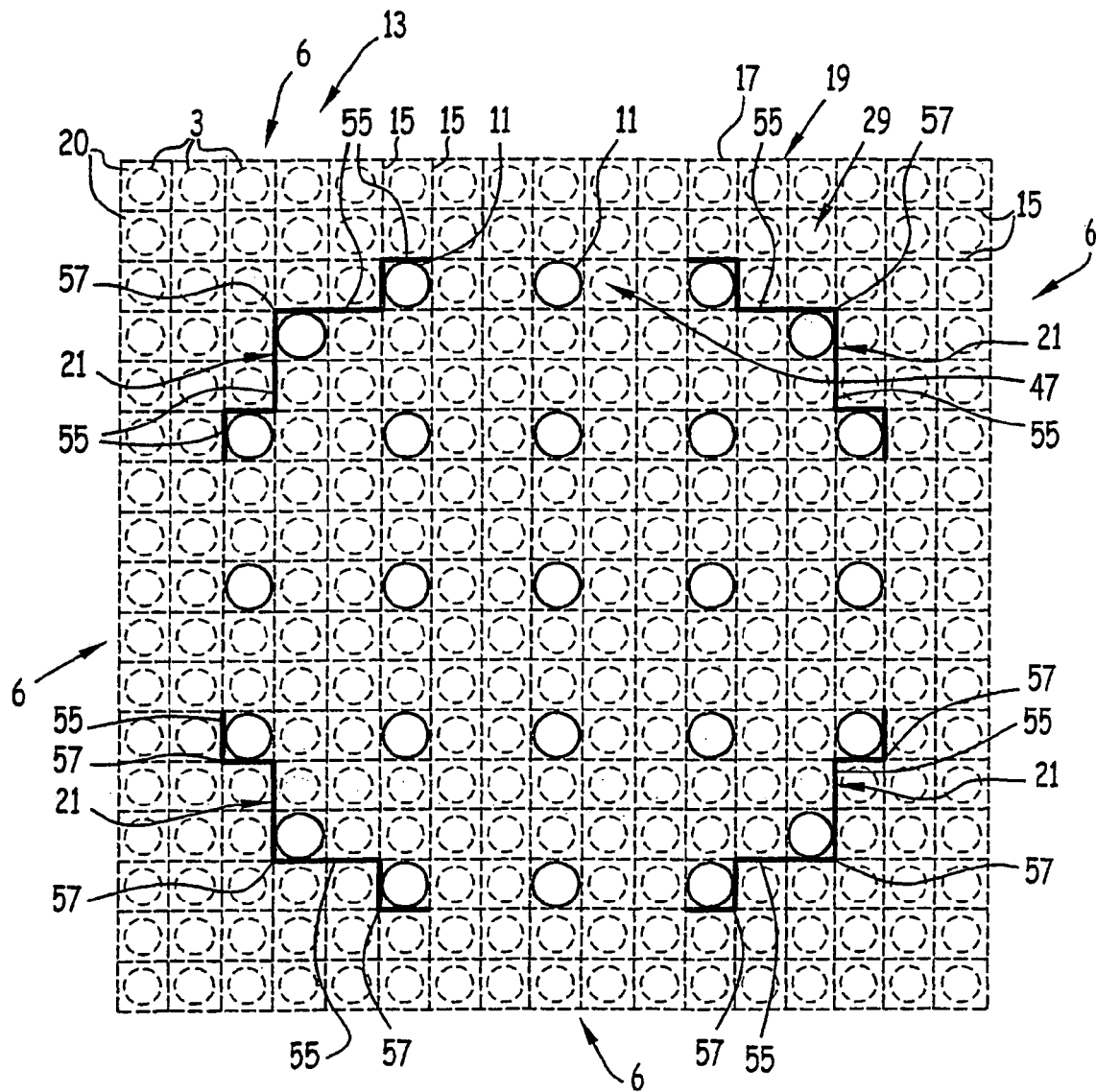
FIG. 13 is a view analogous to FIG. 12, showing a variant of the third embodiment of the invention.

In the variant of FIG. 13, each angle member 21 forms three L-shapes and thus comprises six limbs 55 that meet to form three corners 57 that are open towards the inside of the assembly 1.

The guide tubes 11 to which each angle members 21 is secured are each located in a corresponding corner 57.

This third embodiment also serves to increase the rigidity of the assembly 1, both at the beginning of its life and at the end of its life, while limiting head losses due to the small transverse extent of the angle members 21 leading to a small reduction only in the hydraulic diameter.

As in the second embodiment, openings 45 can be formed in the bottom ends 43 of the angle members 21, or else these ends 43 can be spaced apart from the spacer grids 13 so as to leave passages 49 allowing the cooling fluid to flow transversely.

In each of the above-described embodiments, the devices 21 which are firstly disposed inside the group of rods 3, and not outside it, and which secondly are of small transverse extent, serve to increase the rigidity of the assembly while limiting the head losses due to their own presence.

The invention claimed is:
1. A nuclear fuel assembly comprising:
a group of nuclear fuel rods and a support skeleton, the assembly comprising:
two nozzles;
guide tubes interconnecting the nozzles; and
spacer grids secured to the guide tubes and serving to hold the rods;
the nuclear fuels rods extending along a longitudinal direction and being disposed in a substantially regular array;

the assembly including at least one support skeleton reinforcing device disposed between two successive spacer grids and secured to the guide tubes, and the reinforcing device being disposed inside the group of rods and presenting a transverse extent that is less than the transverse extent of the array of rods.

2. The assembly according to claim 1, wherein the reinforcing device does not extend into a peripheral layer of rods.

3. The assembly according to claim 2, wherein the reinforcing device does not extend between the peripheral layer of rods and an adjacent layer of rods.

4. The assembly according to claim 1, wherein the reinforcing device extends longitudinally substantially as far as a spacer grid immediately above the reinforcing device.

5. The assembly according to claim 1, wherein the reinforcing device defines at least one transverse flow passage above the spacer grid immediately beneath the reinforcing device, the passage serving to pass a cooling fluid for flowing through the assembly.

6. The assembly according to claim 5, wherein the reinforcing device extends longitudinally substantially as far as the spacer grid immediately below the reinforcing device, and wherein the passage is formed by an opening formed through a bottom end of the reinforcing device.

7. The assembly according to claim 5, wherein the bottom end of the reinforcing device is disposed at a distance from the spacer grid immediately beneath the reinforcing device so as to define the transverse flow passage for the cooling fluid.

8. The assembly according to claim 1, wherein the reinforcing device is secured to at least two guide tubes.

9. The assembly according to claim 1, wherein the reinforcing device is a substantially plane plate.

10. The assembly according to claim 9, wherein the reinforcing device is substantially parallel to one of faces of the group of nuclear fuel rods.

11. The assembly according to claim 1, wherein the reinforcing device is an angle member forming at least one L-shape.

12. The assembly according to claim 11, wherein the angle member is disposed in a corner of the group of nuclear fuel rods.

13. The assembly according to claim 1, wherein the reinforcing device does not have a mixer arrangement for mixing the cooling fluid that is to flow through the assembly.

14. The assembly according to claim 1, wherein the reinforcing device has cells for receiving the nuclear fuel rods, wherein the dimensions of each of the cells are greater than the diameters of the nuclear fuel rods.

* * * * *

UNITED STATES PATENT AND TRADEMARK OFFICE
CERTIFICATE OF CORRECTION

| | | |
|---|---|---|
| PATENT NO. | : 8,416,912 B2 | Page 1 of 1 |
| APPLICATION NO. | : 10/573642 | |
| DATED | : April 9, 2013 | |
| INVENTOR(S) | : Guy Gentet et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this
Twenty-fifth Day of June, 2013

Teresa Stanek Rea
*Acting Director of the United States Patent and Trademark Office*